United States Patent [19]

Ohrstedt

[11] 4,129,898
[45] Dec. 12, 1978

[54] LIGHT-DIVERTING ATTACHMENT FOR PHOTOGRAPHIC FLASH UNITS

[76] Inventor: Charles L. Ohrstedt, 66 E. Tulane Rd., Columbus, Ohio 43202

[21] Appl. No.: 747,555

[22] Filed: Dec. 6, 1976

[51] Int. Cl.² ........................................... G03B 15/02
[52] U.S. Cl. ........................................... 362/7; 362/18; 362/32; 362/278; 362/320
[58] Field of Search .................. 290/1 LP, 1.3, 46.53, 290/103; 362/7, 18, 32, 226, 232, 278, 320

[56] References Cited

U.S. PATENT DOCUMENTS

| | | | |
|---|---|---|---|
| 2,881,685 | 4/1959 | Wagner | 240/1.3 |
| 3,449,036 | 6/1969 | Jacobsen | 240/1 LP X |
| 3,638,013 | 1/1972 | Keller | 362/32 X |
| 3,649,118 | 3/1972 | Yano et al. | 362/32 X |
| 3,683,167 | 8/1972 | Rishton | 240/1 LP X |
| 3,712,724 | 1/1973 | Courtney-Pratt | 240/1 LP X |
| 3,825,335 | 7/1974 | Reynolds | 240/1 LP X |
| 3,900,858 | 8/1975 | McCann et al. | 240/1 LP X |
| 4,009,382 | 2/1977 | Nath | 240/1 LP |
| 4,017,727 | 4/1977 | Yamamoto | 240/1.3 |
| 4,060,724 | 11/1977 | Heine et al. | 362/32 X |

FOREIGN PATENT DOCUMENTS

| | | | |
|---|---|---|---|
| 2436378 | 2/1976 | Fed. Rep. of Germany | 240/1 LP |
| 2260746 | 5/1975 | France | 240/1 LP |

*Primary Examiner*—Peter A. Nelson
*Attorney, Agent, or Firm*—William S. Rambo

[57] ABSTRACT

An attachment for a photographic flash unit which functions to divert the high intensity light rays emanating from the flash unit along a path or paths axially or angularly offset relative to the focal axis of the flash unit and an associated camera to thereby provide unusual lighting effects for the subject being photographed, and to prevent intense illumination of the blood vessels of the eyes of a human or other animal subject being photographed.

1 Claim, 5 Drawing Figures

LIGHT-DIVERTING ATTACHMENT FOR PHOTOGRAPHIC FLASH UNITS

BACKGROUND OF THE INVENTION

This invention relates generally to photographic flash devices, and more particularly to a light-diverting attachment that readily mounts over the light-projecting aperture of a photographic flash unit, for selectively projecting light onto a photographic subject at various oblique angles relative to the focal axis of the flash unit.

Most photographers rely on electronic stroboscopic and/or incandescent bulb photographic flash units for illuminating a subject when natural light is insufficient or unavailable. Commonly, such flash units detachably mount on the camera itself, or form an integral part thereof. As a consequence, light emanating from the camera-mounted flash device illuminates the subject uniformly, in a plane parallel to the camera lens. Such "head-on" illumination bathes the subject in light and results in minimal shadow detail, poor texture rendition, and a flat or shallow perspective. And worse, such illumination can cause the eyes of human subjects to appear red as a result of light reflecting from blood vessels within the subject's eyes.

One solution to the problems attendant to head-on lighting is to place the flash unit so that light will be projected at an angle to the focal axis of the camera lens. This angular light projection accentuates shadow detail thereby enhancing the depth characteristics of the photograph and gives the subject a more life-like appearance. Angular lighting also avoids intense illumination of the blood vessels of the subject's eyes, thus eliminating an undesirable "red eye" effect.

There are hand-held photoflash units that can effect this angular light projection if held out at arms length, but these units are comparatively expensive and more difficult to handle than camera-mounted units.

Some camera-mounted flash units effect angular light projection with a tiltable or rotatable light-projecting aperture. These units are designed to bounce light from the ceiling or adjacent walls onto the subject. While bounce lighting does enhance depth and improve texture, as well as mitigate the troublesome red eye effect, it cannot be effectively used where the color of the walls or ceilings might absorb a major portion of the illumination or might impart an unwanted tint onto the subject.

There is, then, the need for a simple, inexpensive means for adapting a camera-mounted flash unit to provide angular light projection now available only with bulky hand-held units, or with frequently ineffective bounce lighting units.

SUMMARY AND OBJECTS OF THE INVENTION:

The present invention provides an angle-lighting attachment for a photoflash unit. It includes a mounting bracket for detachable connection with the flash unit; a connector frame removably engaged with a channel-forming flange on the mounting bracket; and an elongated, flexible, light-transmitting tube rotatably attached to the connector frame so that its proximal end is in registration with the light-projecting aperture of the flash unit. The light-transmitting tube has a distal end that may be positioned at various remotely disposed, axially offset locations relative to the aperture of the flash unit.

It is a primary oject of this invention to provide a light-diverting device, and means for mounting the same on a camera-mounted photoflash unit, for directing light from the flash unit onto a subject from various angles relative to the focal axis of an associated camera.

It is another object to provide an attachment for a photoflash unit that will eliminate red eye effect.

Another object is to provide a light-diverting attachment for a photoflash unit that can be readily demounted to permit normal usage of the flash unit.

A further object is to provide an attachment for a photoflash unit that may be used to provide various unusual lighting effects.

These and other objects will become more apparent from the following description and the accompanying drawings.

Figure 1:
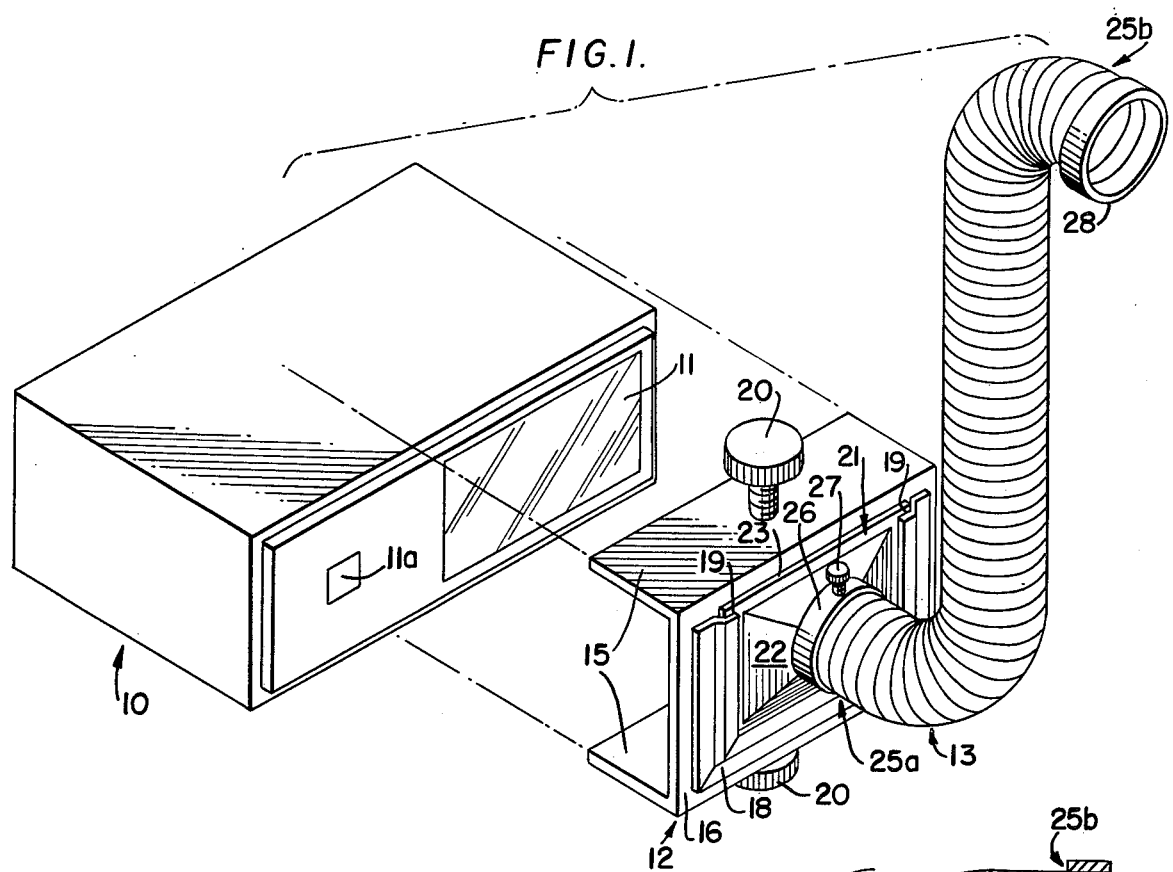
FIG. 1 is an exploded perspective view of a photoflash unit and a light-diverting attachment therefor according to this invention.
Figure 2:
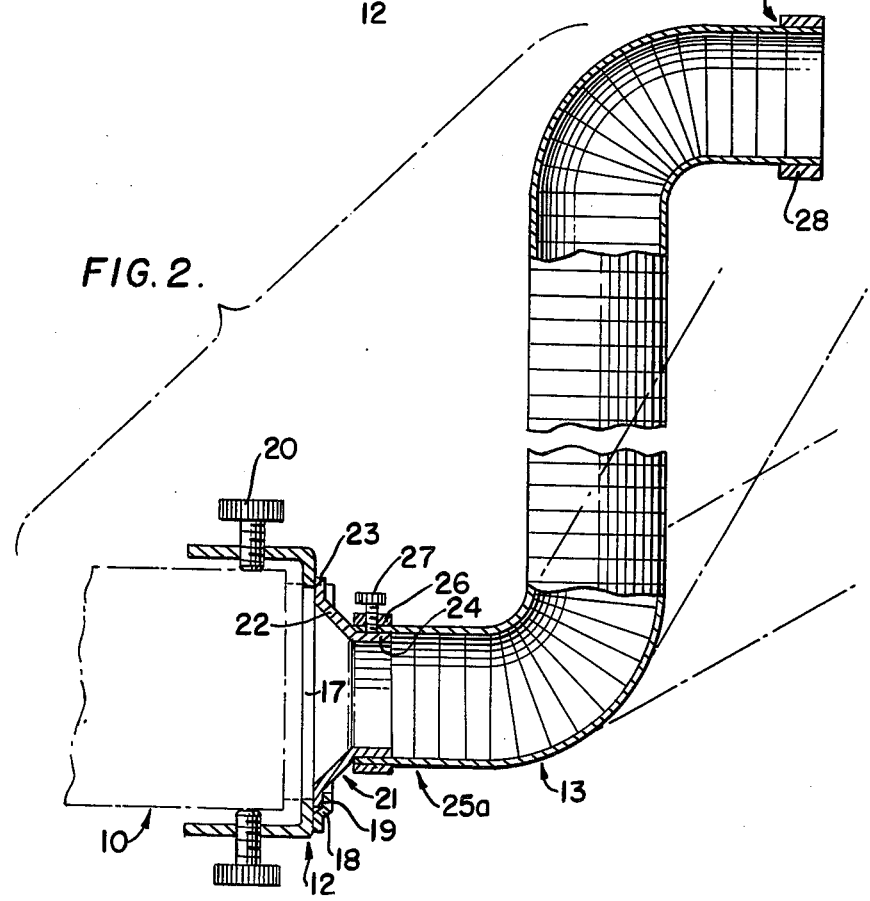
FIG. 2 is a medial, vertical sectional view taken through the light-diverting attachment shown in FIG. 1, but with the photoflash unit shown in part by broken lines.

DESCRIPTION OF PREFERRED EMBODIMENTS:

FIGS. 1 and 2 of the drawings illustrate a preferred form of light-diverting attachment according to this invention and adapted for quickly detachable connection with a conventional, camera-mounted electronic photoflash device 10. The particular photoflash unit 10 includes a light-projecting aperture 11 and a light sensing lens 11a, both arranged in the front side of the flash unit 10. The attachment comprises, generally, a mounting bracket 12 for attachment to the photoflash unit 10; a connector frame 21 removably carried by the mounting bracket 12; and a flexible light-diverting tube or gooseneck conduit 13 rotatably attached to the connector frame 21.

The mounting bracket 12 takes the form of a generally channel-shaped body having opposed, rectangular side walls 15 and an orthogonally arranged front wall 16. The front wall 16 is cut out to define an opening or window 17 to permit the passage of light therethrough. The window 17 is framed on three sides by an offset border flange 18 fixed to the front wall 16. The border flange 18, together with the front wall 16 of the mounting bracket 12, form a channel 19 around the window 17. The side walls 15 of the mounting bracket 12 are provided with set screws 20 having relatively enlarged knurled heads.

The connector frame 21 comprises a hollow, truncated body 22 having a rectangular base flange or lip 23, and terminating at its apex or outer end in an annular throat portion 24. The connector frame 21 is placed in registration with window 17 of mounting bracket 12 by sliding the base flange 23 into channel 19 behind border flange 18.

The tube 13 is normally shape-retentive, but is readily bendable and preferably has a highly reflective, polished or silvered interior wall. Tube 13 defines an open, light-transmitting passage and has an inner or proximal end portion 25a rotatably fitted over the circular throat portion 24 of the connector frame, and is held in place thereon by a snug fitting annular collar 26 and set screw 27. The tube 13 has a remotely extending, open distal end portion 25b fitted with an annular collar 28.

In use, the mounting bracket 12 is attached to the flash unit 10 by aligning window 17 with aperture 11, taking care not to cover electric eye 11a, and then tightening set screws 20. Next, connector frame 21 is slid into place over window 17 by engaging the flanged lip portion 23 in channel 19.

Now when the flash unit 10 is triggered, light emanating from the aperture 11 will be conducted through the internally polished tube 13, and out through the open distal end portion 25b. The distal end 25b of the tube 13 can be selectively positioned by bending the tube, or by rotating it about throat 24 to thereby project light at various different angles relative to the focal axis of the associated camera. As will be readily apparent, by simply disengaging and removing the connector frame 21 and the attached tube 13, light can pass, undiverted from the aperture 11 of the flash unit through window 17 to permit normal usage of the flash unit. If desired, the diverted light can be colored or focused by placing colored filters or focusing lenses (not shown) over the distal end 25b of the tube. Alternatively, output light can be colored by inserting colored filters between the window 17 and connector frame 21.

Figure 3:
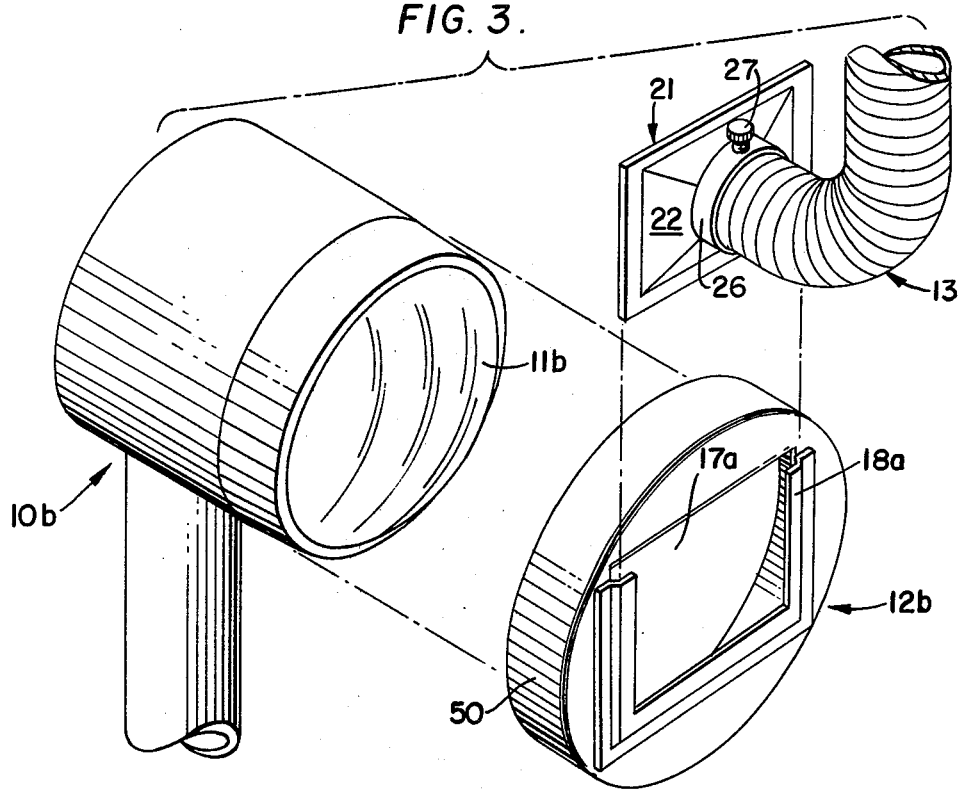
FIG. 3 is an exploded perspective view of a modified type of photoflash unit and mounting bracket therefor.

Referring now to FIG. 3 of the drawings, a modified mounting bracket 12b is shown. The bracket 12b takes the form of a shallow cylindrical cap or sleeve 50 arranged to frictionally telescope over the circular bezel of a conventional, search light-shaped flash unit 10b. The mounting bracket 12b is formed with a rectangular window 17a bordered by flanges 18a identical to those shown in FIGS. 1 and 2 and which will accept the same connector frame 21 and flexible tube unit 13 as shown in FIGS. 1 and 2. Aside from the difference in shape of the mounting bracket 12b, it functions identically to the attachment illustrated in FIGS. 1 and 2.

Figure 4:
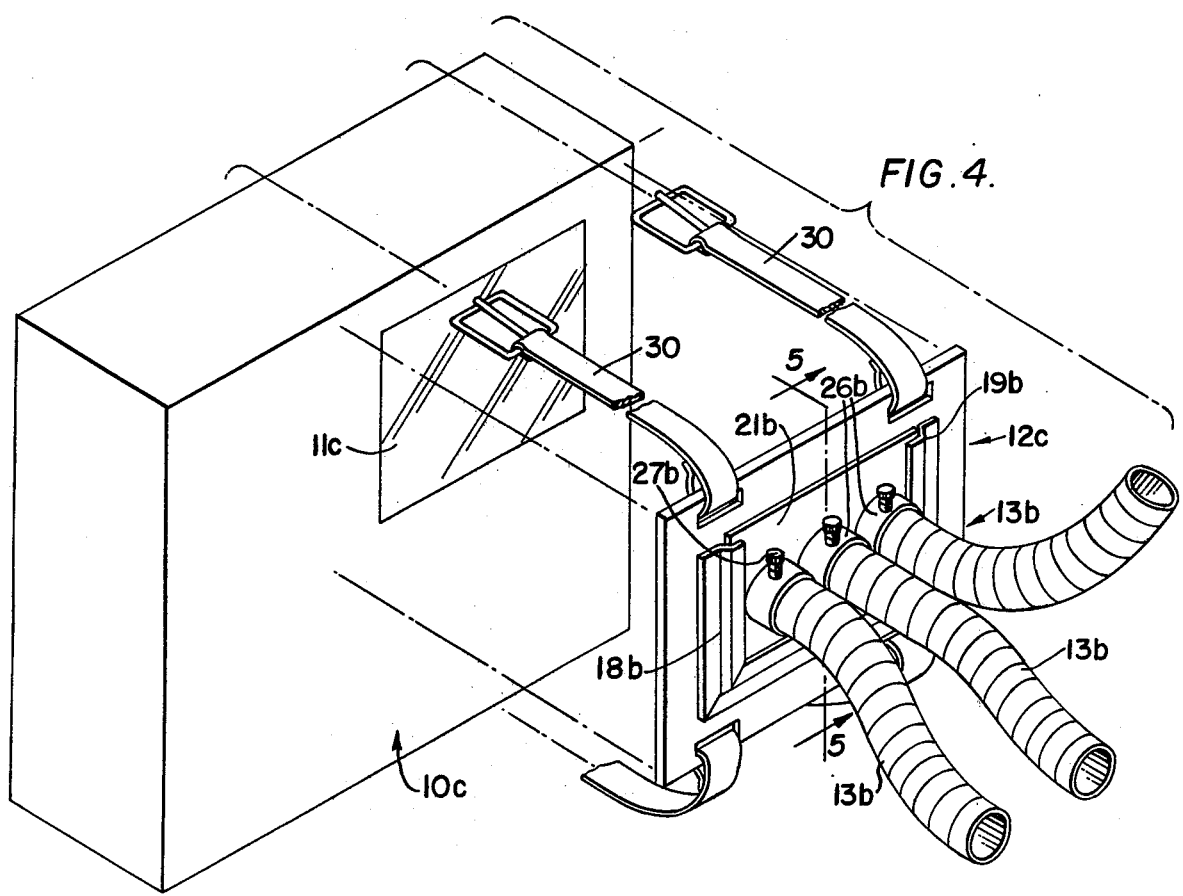
FIG. 4 is a similar view of a further modified form of light-diverting attachment which embodies three light-diverting tubes and a strap and buckle-type mounting bracket.
Figure 5:
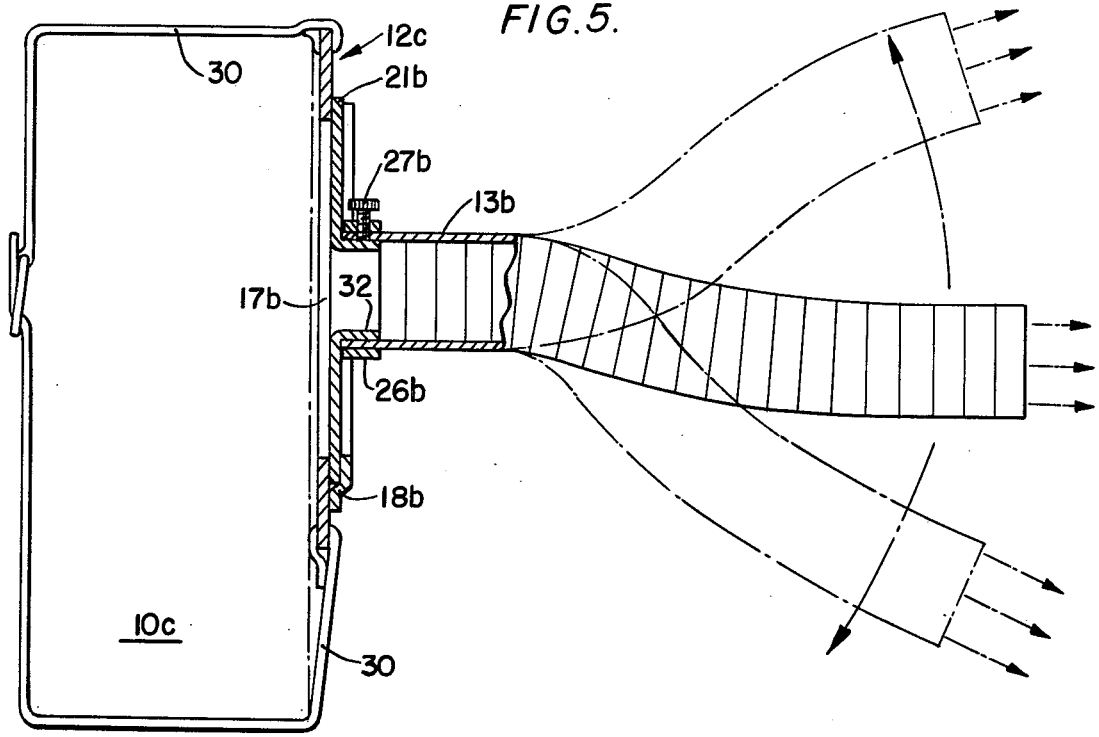
FIG. 5 is a medial vertical sectional view taken approximately along the line 5–5 of FIG. 4 and showing differently adjusted positions of the light-diverting tube in broken lines.

A second modified form of attachment is shown in FIGS. 4 and 5 and comprises a substantially flat, planar mounting bracket 12c having buckle secured flexible attachment straps 30 for securing the frame to a conventional box-shaped flash unit 10c. The mounting bracket 12c is formed with an opening or window 17b, border flanges 18b and channel 19b identical to those previously described. A modified, rectangular plate-like connector frame 21b is detachably carried in the channel 19b and is formed with three, relatively spaced apart, outwardly projecting annular mounting flanges 32.

A flexible, light-conducting tube 13b is telescoped over each of the annular mounting flanges 32, and is held thereon by a snug fitting collar 26b and a set screw 27b in a manner comparable to the previously described structure.

In operation, the flexible tubes 13b may be individually bent to project light in several different directions, or they may be arranged in relatively parallel relation to transmit light in the same general direction. Angularly disparate positioning of the tubes 13b makes it possible to provide primary illumination of a subject from one angle, and shadow-softening, "fill in" illumination from a different angle or angles.

From the foregoing it will be seen that these light-diverting attachments make the camera-mounted photoflash unit far more versatile. Using the present attachment, camera-mounted flash units are no longer limited to detail-obscuring, head-on light projection. Instead, such flash units can be adapted to angularly project light onto a subject, yielding photographs that rival those taken with expensive, multiple photoflash units. Furthermore, the intense illumination of optic blood vessels and the resulting red eye images are eliminated. The attachment can, if desired, function to direct light onto walls or ceilings in a "bounced" light mode. In addition, other special lighting effects, such as simultaneous illumination from multiple angles, or pinpoint illumination of small objects, are made possible.

While several preferred embodiments of my invention have been illustrated and described in detail, it is obvious that various changes in details of construction and design may be resorted to without departing from the spirit of the invention as defined by the following claims.

I claim:

1. A light-diverting attachment for a photoflash unit having a light-emitting aperture, comprising:
    (a) a mounting bracket for quickly detachable external connection to a photoflash unit and having an opening for registration with the light-emitting aperture of the photoflash unit and a channel-forming flange disposed in surrounding relation to said opening; and
    (b) an elongated, hollow, bendable tube having an open, light-transmitting passage extending therethrough and a proximal end portion provided with a connector frame detachably engaged with the channel-forming flange of said mounting bracket in surrounding relation to the opening thereof and a distal, light-projecting end portion extending remotely from said mounting bracket, said tube being normally shape-retentive, but being manually bendable to locate the light-projecting end portion thereof at various axially offset positions with respect to the opening of said mounting bracket and the light-emitting aperture of the photoflash unit.

* * * * *